(12) United States Patent
Chan

(10) Patent No.: US 10,650,669 B1
(45) Date of Patent: May 12, 2020

(54) SYSTEM OF LIVING

(71) Applicant: Mark Kit Jiun Chan, Hong Kong (CN)

(72) Inventor: Mark Kit Jiun Chan, Hong Kong (CN)

(*) Notice: Subject to any disclaimer, the term of this patent is extended or adjusted under 35 U.S.C. 154(b) by 0 days.

(21) Appl. No.: 16/218,684

(22) Filed: Dec. 13, 2018

Related U.S. Application Data

(63) Continuation of application No. 14/616,852, filed on Feb. 9, 2015, now Pat. No. 10,176,686.

(60) Provisional application No. 61/937,661, filed on Feb. 10, 2014.

(51) Int. Cl.

| | |
|---|---|
| *H04M 1/68* | (2006.01) |
| *G08B 29/18* | (2006.01) |
| *H04W 4/029* | (2018.01) |
| *H04W 68/00* | (2009.01) |
| *G08B 13/00* | (2006.01) |
| *G08B 21/22* | (2006.01) |
| *G07C 9/00* | (2020.01) |
| *H04W 4/33* | (2018.01) |
| *G08B 25/00* | (2006.01) |
| *H04L 29/08* | (2006.01) |
| *H04W 12/08* | (2009.01) |
| *H04W 4/021* | (2018.01) |
| *H04L 29/06* | (2006.01) |
| *G08B 25/14* | (2006.01) |
| *H04W 12/00* | (2009.01) |
| *H04W 4/70* | (2018.01) |

(52) U.S. Cl.
CPC ............ *G08B 29/188* (2013.01); *G07C 9/00* (2013.01); *G07C 9/00111* (2013.01); *G08B 13/00* (2013.01); *G08B 21/22* (2013.01); *G08B 25/008* (2013.01); *G08B 25/14* (2013.01); *H04L 63/107* (2013.01); *H04L 67/12* (2013.01); *H04W 4/021* (2013.01); *H04W 4/029* (2018.02); *H04W 4/33* (2018.02); *H04W 12/08* (2013.01); *H04W 68/005* (2013.01); *H04W 4/70* (2018.02); *H04W 12/00502* (2019.01); *H04W 12/00503* (2019.01)

(58) Field of Classification Search
CPC ......... G08B 13/22; H04W 4/04; H04W 68/00
USPC ........................................................ 455/411
See application file for complete search history.

(56) References Cited

U.S. PATENT DOCUMENTS

| | | | |
|---|---|---|---|
| 7,123,149 B2 * | 10/2006 | Nowak .............. | G06K 17/0022 340/572.1 |
| 7,154,398 B2 * | 12/2006 | Chen ..................... | G08B 25/016 340/573.1 |
| 7,277,018 B2 * | 10/2007 | Reyes ...................... | G08B 7/06 340/521 |
| 8,620,269 B2 * | 12/2013 | Johar .................. | G07C 9/00111 370/338 |

(Continued)

*Primary Examiner* — Amancio Gonzalez

(57) ABSTRACT

A system and method used for monitoring conditions in a space through characterizing detected occupants with properties in accordance with time, location and tracked traversal path. The intruder as a detected occupant is distinguished from the tenant, property management staff, and visitor. The system triggers an alert indicative of a condition by sending signals and messages to selected devices or systems as receiving nodes. A condition, such as collected sensor data incompliant to a threshold, is detected and an alert is triggered. A user carried mobile device such as the cellular phone, elevator control system operative in a building are possible receiving nodes of a triggered alert for a detected condition.

15 Claims, 6 Drawing Sheets

(56) References Cited

U.S. PATENT DOCUMENTS

| | | | | |
|---|---|---|---|---|
| 9,003,497 | B2* | 4/2015 | Bohli | H04L 63/061 |
| | | | | 726/4 |
| 9,026,648 | B1* | 5/2015 | Slavin | G08B 25/08 |
| | | | | 709/224 |
| 9,037,136 | B2* | 5/2015 | Carnall | G08B 21/22 |
| | | | | 455/435.1 |
| 9,226,259 | B2* | 12/2015 | Noonan | H04W 4/90 |
| 9,286,772 | B2* | 3/2016 | Shapiro | G08B 3/10 |
| 9,402,545 | B2* | 8/2016 | Baker | H04W 4/029 |
| 2003/0174049 | A1* | 9/2003 | Beigel | G06K 19/0716 |
| | | | | 340/10.42 |
| 2009/0140854 | A1* | 6/2009 | Golander | G08B 13/2494 |
| | | | | 340/540 |
| 2013/0321159 | A1* | 12/2013 | Schofield | A01K 11/008 |
| | | | | 340/573.3 |
| 2015/0123810 | A1* | 5/2015 | Hernandez-Rosas | |
| | | | | H04W 76/14 |
| | | | | 340/870.02 |
| 2015/0177722 | A1* | 6/2015 | Chan | G05B 15/02 |
| | | | | 700/275 |
| 2016/0148489 | A1* | 5/2016 | Reeder | A61B 5/0002 |
| | | | | 340/501 |
| 2017/0124824 | A1 | 5/2017 | Chan | 13/22 |

\* cited by examiner

100

203

300

400

500

600

SYSTEM OF LIVING

This application is a Continuation of U.S. application Ser. No. 14/616,852, filed Feb. 9, 2015, and is based on and claims priority to U.S. provisional application No. 61/937,661, filed Feb. 10, 2014, all of which are Incorporated herein by reference in their entireties.

TECHNICAL FIELD

The present invention relates to an occupant identification system ("identification system") and methods to monitor a living space and detect the approaching, prowling and departing occupants. The monitored living space pertains to a unitary and independent complex, as well as, a tenant unit in a residential building. The detected occupant is classified as the tenant, property management staff, visitor, and intruder. The tenant is identified through a user carried mobile device, such as those used in digital cellular systems, personal communications systems ("PCS"), enhanced specialized mobile radios ("ESMRs"), radio frequency ("RF") based tracking systems (Bluetooth, WiFi, ZigBee), and other wireless communications apparatuses. More particularly, but not exclusively, the present disclosure relates to methods that generate alerts to selected user carried mobile devices upon detection of occupancy classified as intrusion; furthermore, the system correspondingly limits the use of the elevator within a building for the safety of all tenants.

BACKGROUND ART

A living space typically undergoes dynamic traffic in accordance with the daily activities of the residing tenant ("user"), comprising departing, returning and staying within. Other accepted users of the living space environment include property management staff and visitors. Prevention of trespassing on the living space by intruders entails user activated alarm system, closed-circuit television ("CCTV") monitoring and patrolling by management staff.

Technical Problem

Unresolved-problem of the alarm system commonly relates to false alarm triggered by animals and heedless users. Each response to an alarm, true or false, demands consumption of security resources. In converse, the alarm is dependent on user activation and is otherwise unreactive to actual Intrusion. Unless the CCTV Is actively monitored by staff who are vigilant and aware of superficial characteristics of the users, it is commonly regarded as a recording means of the site of incident. The corresponding outcome is ineffective assurance of alert sending prior to and during intrusion of a monitored living space. After the Intruder completes the intended activities within the living space, he easily uses the elevator and escapes to other building territories and endangers safety of other users during the process Many security control panels most oftenly notify a communicatively connected remote host station by using cellular, telephone lines, or other landline (broadband) connection. Those systems, however, may be disabled by damaging or disrupting the line connection.

An occupant entering a monitored living space territory usually triggers a non-discriminant siren activation within a preconfigured time period. Arming and disarm such alarm system requires user activated procedure. In fact, the intruder is unidentified unless trespassing on the monitored territories is enacted. What remains an unresolved problem is that an intrusion is commonly unveiled by the user after returning to the monitored living space.

DESCRIPTION OF THE INVENTION

Technical Solution

The present invention provides a system and methods to monitor a living space, to self-trigger an alarm operation and disarm the alarm operation when the user is within the living space.

To counter line disablement, the system encompasses a pulser to send signals to the cloud based application server in accordance with a preconfigured address and frequency. When signal disruption from the system in the monitored space to the application server occurs, the application server is programmed to determine if signaling of system in the monitored space is possibly damaged, and to trigger an alert for sending to designated receiving parties. Therefore, the system cannot be disabled by merely cutting the landline connection to the monitored environment. In the event of detected Intrusion, the system alerts related parties through the send of messages to selected devices upon, or prior to an Incident of possible Intrusion and trespassing.

The operation also Involves preventing the detected Intruder from using the elevator for escape, as well as the elevator loaded with passengers from landing at the floor of detected incident.

Advantageous Effects

Security of the monitored living space entails identification of the occupancy status within and the environment around it. The invention entails characteristics which distinguishes the system operation from ordinary alarm systems. Commonplace systems require user activation in an alarm operation and manual deactivation of it—the invention involves automated activation and deactivation of an alarm operation. This automated security feature will be particularly advantageous to the elderly and unmindful users.

In another embodiment, a method for detection and identification of the intruder is enacted before trespassing on the monitored territory. Several responses may be enacted by the alarm system, including alerting the related parties through sending a message to their carried mobile devices or a network connected client computer, as well as, sending a message to the building elevator system for directing passenger occupied elevators away from the floor of incident, preventing the tracked intruder from using the elevator for escape, and bringing the property management staff to Intended territories within the building. A siren may be triggered as an active response.

In a different aspect, the system processes sensor signals and information in a cloud-based server, communicative disconnection under any circumstances result in immediate alerts to the related parties. Operatively of the alarm system is consistently, remotely and self-diagnostically monitored.

DESCRIPTION OF DRAWINGS

The drawings constitute to embodiments of the present Invention and serve to depict the apparatuses infrastructure and operating principles.

BEST MODE

Exemplary embodiments of the invention are discussed in detail below. While specific exemplary embodiments are discussed, it should be understood that this is done for Illustration purposes only. A person skilled in the relevant art will recognize that other components and configuration can be used without departing from the spirit and scope of the invention.

Time and Location Based Monitoring and Alarm Operation

Figure 1:
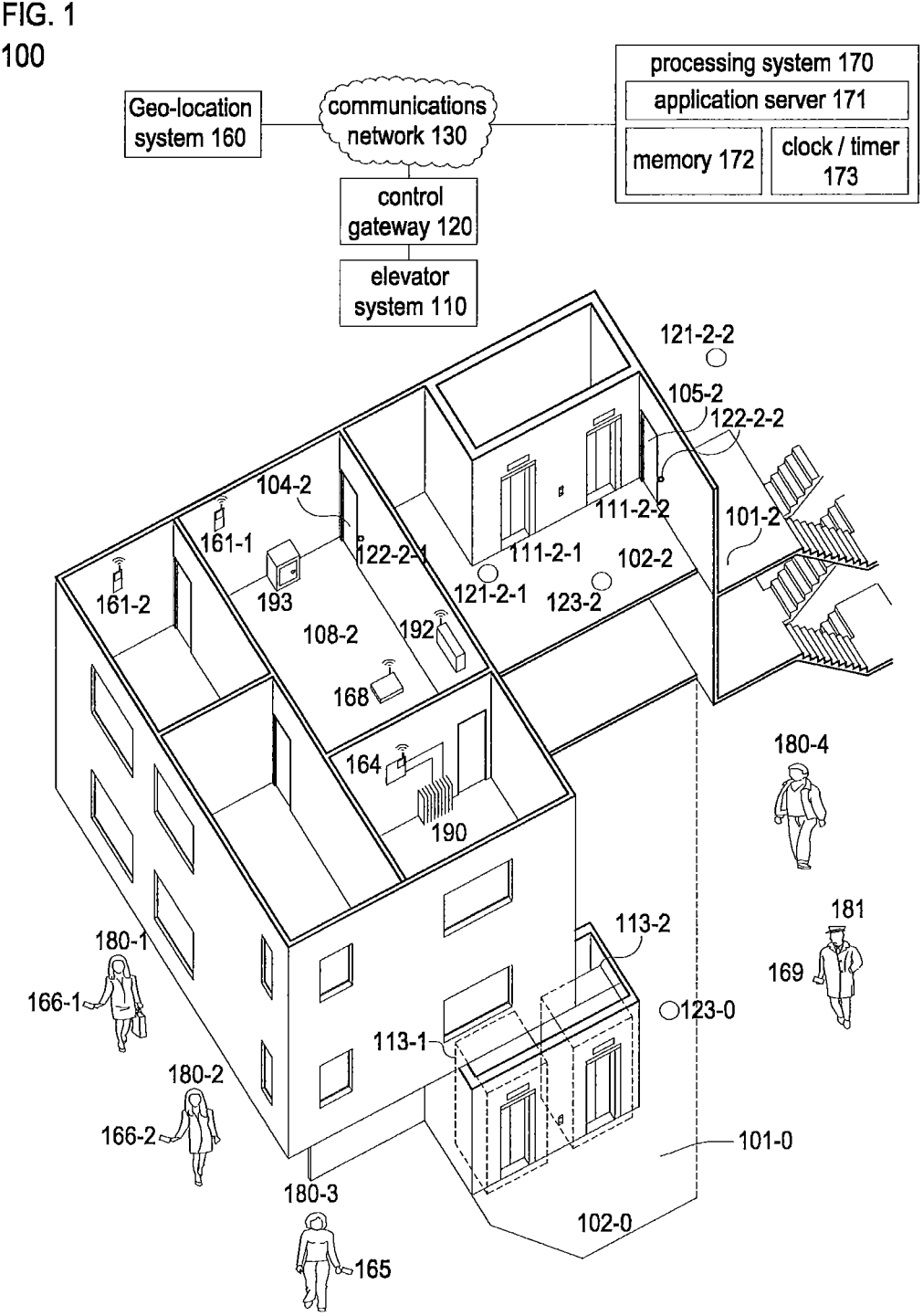
FIG. 1 depicts a home environment under surveillance of an alarm control system of the present invention.

As depicted in FIG. 1, building environment 103 is installed with elevator system 110, comprising but not limited to two elevator cars 113-1 and 113-2 commuting between ground floor 101-0 and a plurality of tenant floors 101—including tenant floor 101-2. The components of elevator system 110 installed at tenant floor 101-2 include elevator doors 112-2-1 and 112-2-2, which correspond with elevator doorways 111-2-1 and 111-2-2.

Access gateway 168 is configured to receive signals transmitted by a plurality of communicatively connected devices, including but not limited to: occupancy sensors 161-1 and 161-2 upon detection of occupancy within home environment 108-2; door sensor 122-2-1 upon opening/closing of door 104-2; device 163 upon a change of state between operative/non-operative, and/or open/close; pulser 167 periodically sending wired and/or wireless signals. Said signals are received by access gateway 168 and transported to application server 140 via communications network 130.

Control gateway 120 is configured to receive information comprising signals and data ("preferred information") transmitted by a plurality of communicatively connected systems and devices, including but not limited to: elevator system 110, tenant floor 101-2 installed occupancy sensors 121-2-1 and 121-2-2, door sensors 122-2-1 and 122-2-2, surveillance device 123-2, as well as, surveillance device 123-0 installed at tenant floor 101-0.

In embodiment one, users 180-1 and 180-3 as inhabitants carrying mobile devices 166-1 and identification means 165, respectively, step out of monitored home environment ("home environment") 108-2—triggering door sensor 122-2-1 to send a signal upon opening door 104-2 at time $t_0$, and occupancy sensor 121-2-1 to send a signal at time $t_1$ upon detection in waiting lobby 102-2, prior to elevator car 113-1 landing at tenant floor 101-2 at time $t_2$. Control gateway 120 receives the preferred information pertaining to elevator car 113-1 or 113-2 landing at tenant floor 101-2 from elevator system 110, and sends to application server 140. Application server 140 prompts a message requesting for a response message to mobile device 166-1, which sends a short-range wireless response message received by surveillance device 123-2, but not received by access gateway 168. The cloud messaging technology may be utilized for the process, including but not limited to the Goggle Cloud Messaging for Android. In furtherance, surveillance device 123-2 detects identification means 165; whereas, gateway 168 is unable to detect identification means 165. An alarm operation pertaining to home environment 108-2 is activated by application server 140 upon the lapse of a time period, which exceeds a preconfigured first threshold value. Detected occupancy by occupancy sensors 161-1 or 161-2 will trigger transmission of signals to application server 140 through access gateway 168 and communications network 130: application server 140 will send an alert to mobile device 166-1, and digital device 169 used by management security staff 181.

In embodiment two, user 180-1 as inhabitant carrying mobile device 166-1 steps out of home environment 108-2: door sensor 122-2-1 is triggered to send a signal when door 104-2 undergoes a change from closed state to open state; in addition, occupancy sensor 121-2-1 detects occupancy in waiting lobby 102-2. Wherein, user 180-2 as inhabitant carrying mobile device 166-2 remains in home environment 108-2. Application server 140 prompts a message requesting for a response message to mobile devices 166-1 and 166-2. Mobile device 166-1 sends a short-range wireless response message, which is received by surveillance device 123-0; whereas, mobile device 166-2 sends a short-range wireless response message, which is received by access gateway 168: an alarm operation pertaining to home environment 108-2 is not activated by application server 140.

Time Based Path Tracking Surveillance

Figure 2:
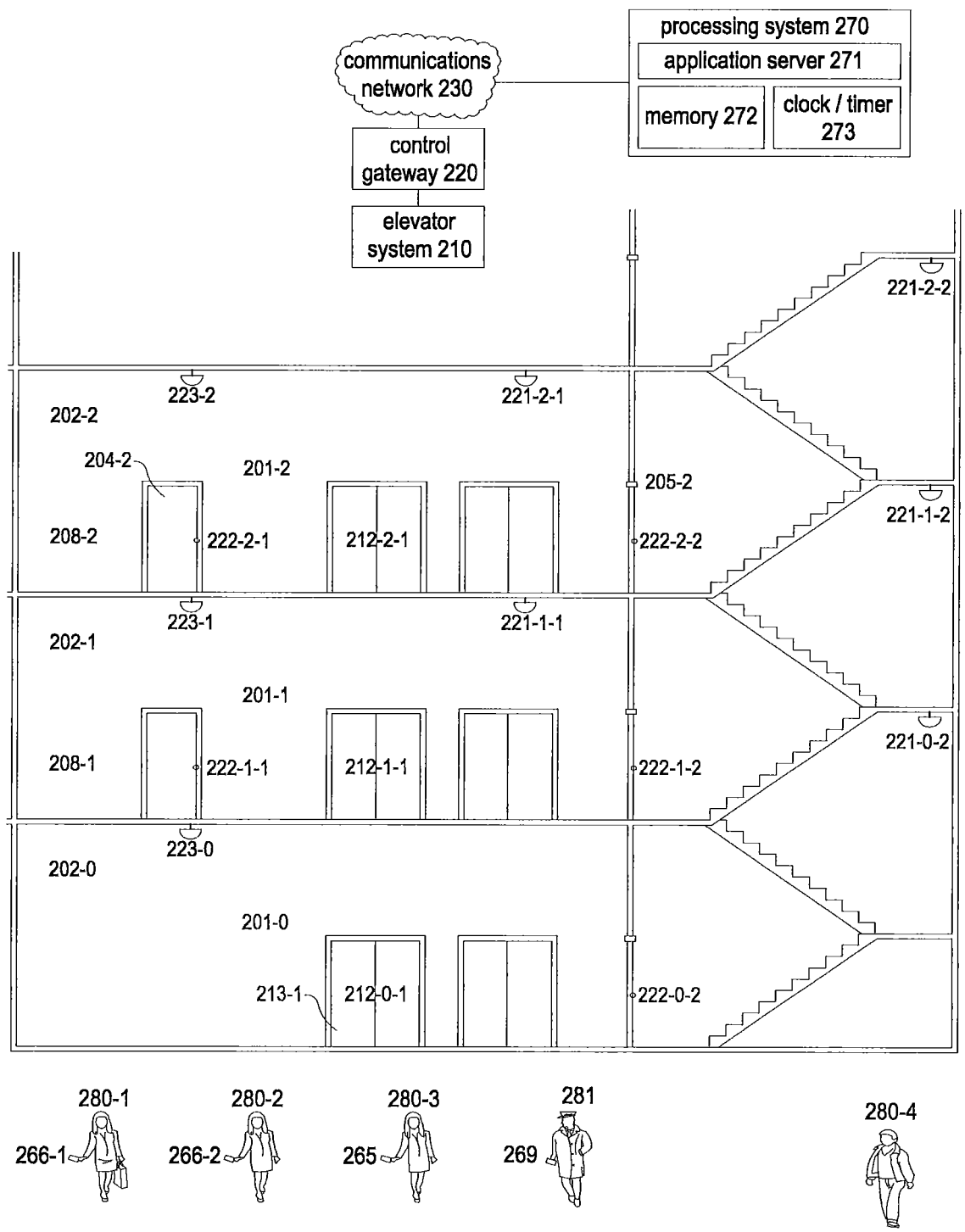
FIG. 2 depicts the alarm control system triggering an alert for send to targeted users in an alarm operation within a residential building environment.

FIG. 2 illustrates one aspect of building environment 203, which is continuously monitored under an active alarm operation on basis of characterizing tracked user traversal path with respect to time adopted by cloud service node located, processor mounted application server 240 ("clock time"). Wherein, at least one control gateway 220 is communicatively connected with a plurality of occupancy sensors 221, door sensors 222, surveillance devices 223, pulsers 227, as well as, elevator system 210—installed and operative within building environment 203.

Time based user traversal path tracking pertains to application server 240 tracking user traversal path on basis of time characterization with respect to clock time, through preferred information receiving from other systems and devices, comprising: (1) one or more occupancy sensors 221 for occupancy detection; (2) one or more surveillance devices 223 for detection of mobile devices 266 and identification means 265 sent wireless signals; (3) one or more door sensors 222 for detection of the change of state of doors in building environment 203; and (4) elevator system 210 sent landing schedule. Wherein, a detected occupant constitutes each point of detection to a time based user traversal path. Should a detected occupant remain at any particular location for time duration exceeding a preconfigured second threshold value, application server 240 triggers an alert. In the event that the total time period exercised in any particular user traversal path exceeds a preconfigured third threshold value-application server 240 triggers an alert. In the event that signals sent by pulsers 227-0, 227-1, 227-2 to the corresponding surveillance devices 223-0, 223-1, 223-2 are disrupted-application server 240 triggers an alert.

In embodiment three, user 280-4 as trespasser traverses within building environment 203. User 280-4 arrives at waiting lobby 202-0 of ground floor 201-0, and enters through elevator doors 212-0-1 into elevator 213-1. User 280-4 arrives at waiting lobby 202-2 of tenant floor 201-2, and is detected by occupancy sensor 221-2-1 at time $t_0$. User 280-4 opens emergency door 205-2—triggering door sensor 222-2-2 to transmit a signal at time $t_1$, and is detected by occupancy sensor 221-2-2 at time $t_2$ when traverses to the stairs territory at tenant floor 201-2. Application server 240 receives the related information through communications network 230 from control gateway 220. User 280-4 prowls about at the location for a time period that exceeds the preconfigured second threshold value: application server 240 sends an alert to digital device 269 used by management security staff 281, as well as, mobile device 266-1 carried by user 280-1 as the sole inhabitant of tenant unit 208-2.

In embodiment four, user 280-4 as trespasser traverses within building environment 203—arriving at waiting lobby 202-0 and traversing through stairs territories at tenant floors 201-0, 201-1, and 201-2—is sequentially detected by occupancy sensors 221-0-2, 221-1-2, and 221-2-2. User 280-4 opens emergency door 205-2—triggering door sensor 222-2-2 to transmit a signal at time $t_3$, and is detected by occupancy sensor 221-2-1 at time $t_4$ when traverses to waiting lobby 202-2. On the other hand, user 280-1 as inhabitant of tenant unit 208-2 enters waiting lobby 202-2 through elevator doors 212-2-1 in an open state imminently before time $t_3$. Users 280-1 and 280-4 traverse toward door 204-2—door sensor 222-2-1 transmits a signal upon detecting change from closed state to open state at $t_5$. At $t_6$, door sensor 222-2-1 senses a closed state; whereas, occupancy sensor 221-2-1 detects non-occupancy. Application server 240 receives the related information through communications network 230 sent by control gateway 220. Entry into tenant unit 208-2 pertain to two separate time based tracked user traversal paths of users 280-1 and 280-4: application server 240 sends an alert to digital device 269 used by management security staff 281, as well as, mobile device 266-1 carried by user 280-1.

In embodiment five, user 280-3 as visitor reports to management security staff 281 about an intended visit to tenant unit 208-2. At time $t_7$, management security staff 281 sends the related information to application server 240 through digital device 269. At the same time, management security staff 281 provides Identification means 265 to user 280-3 to carry as mandate for the visit. However, since time $t_7$ after a time period of visit $\Delta t_v$, which exceeds a preconfigured forth threshold, application server 240 has not received from control gateway 220 information pertaining to tracked traversal path of user 280-3, comprising one or more of the following events: (1) elevator system 210 landing at tenant floor 201-2; (2) detected occupancy by occupancy sensor 221-2-1, or, door sensor 222-2-1 detecting door 204-2 change from closed state to open. In contrary, control gateway 220 sends to application server 240 preferred Information, comprising: (1) door sensor 222-0-2 detecting door opening at time $t_8$; (2) occupancy sensor 221-0-2 detecting occupancy at time $t_9$; (3) door sensor 222-1-2 detecting door opening at time $t_{10}$; (4) occupancy sensor 221-1-1 detecting occupancy in waiting lobby 202-1, and surveillance device 223-1 receiving Identification means 265 sent wireless signals at time $t_{11}$; (5) door sensor 222-1-1 detecting door opening at time $t_{12}$. Application server 240 sends an alert Including said preferred information to a plurality of receiving nodes, comprising but not limited to: digital device 269 carried by management security staff 281, mobile device 266-1 carried by user 280-1 as the sole Inhabitant of tenant unit 208-1, and mobile device 266-2 carried by user 280-2 as the sole inhabitant of tenant unit 208-2.

In embodiment six, control gateway 220 operates with elevator system 210 in an alarm operation: Information comprising tenant floor 201-1 pertains to a triggered alert Is sent in a commanding message by application server 240. Through communications network 230, control gateway 220 receives said commanding message for transport to elevator system 210: In accordance with said commanding message, elevator system 210 evaded floor landing or door opening of elevator 313 at tenant floor 201-1.

Time and Location Based Monitoring and Alarm Operation

Figure 3:
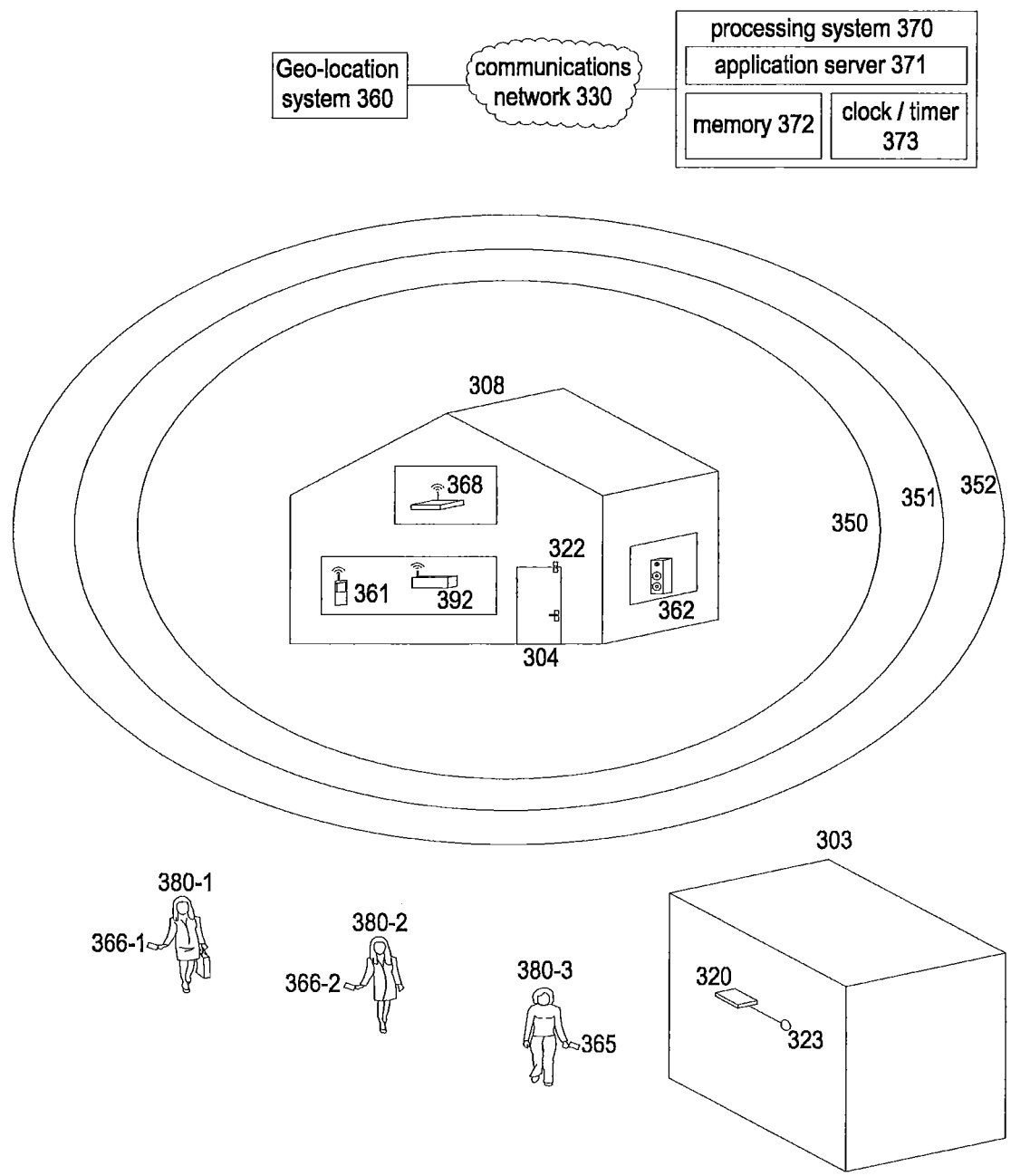
FIG. 3 illustrates an alarm operation for the monitored home environment remote from a building environment location.

FIG. 3 presents an exemplary embodiment of environment 300—comprising the predefined circular geo-fence area 350, with a radius corresponding to the maximum offset between the computed center-of-mass being the monitored home environment 308 and the furthest edge of geo-fence boundary of geo-fence area 350. Building environment 303 is located outside geo-fence area 352.

In embodiment seven, mobile device 366-2—carried by user 380-2 as the sole inhabitant of monitored home environment 308—periodically sends the concurrent geo-location information, or Global Positioning System ("GPS") based information, to application server 340 via communications network 330. At instantaneous time $t_1$, user 380-2 is within geo-fence area 352, pertaining to distance $d_1$ from home environment 308; at instantaneous time $t_2$, user 380-2 is within geo-fence area 351, pertaining to distance $d_2$ from home environment 308:

$$v=(d2-dt)(t2-t1) \qquad [1]$$

where, v is the traversing velocity of user 380-2.

Projected arrival time $t_a$ of user 380-2 at home environment 308, can be calculated:

$$t_a=t_c+\Delta t_a \qquad [2]$$

where, $t_c$ is the concurrent time; whereas, lead time period $\Delta t_a$ can be calculated, using:

$$\Delta\square\square ta=\gamma\cdot dv \qquad [3]$$

where, v is calculated as shown in formula (1); d is the distance between user 380-2 and home environment 308 at concurrent time $t_c$; whereas, γ represents a preconfigured factor pertinent to the uncertain preconditions affecting lead time period $\Delta t_a$, such as time of the day, the unique identifier of mobile device 366-2 and characteristics of user 380-2 or home environment 308, etc.

In embodiment eight, mobile device 366-2—carried by user 380-2 as the sole inhabitant of monitored home environment 308—establishes data-logging with surveillance device 323. Control gateway 320 transports the preferred information to application server 340 via communications network 330, comprising: reception of mobile device 366-2 sent wireless signals and geo-location of building environment 303. Application server 340 is then able to estimate the projected arrival time $t_a$ of user 380-2 at home environment 308 in accordance with the presented formulae.

Other formulae and methods may seem fit in different situations where appropriate and therefore can also be applied for application server 340 to perform calculations of projected arrival time $t_a$ of user 380-2 at home environment 308.

In embodiment nine, mobile device 366-1—carried by user 380-1 as sole inhabitant of home environment 308—is configured to send the corresponding geo-location information in accordance with a preconfigured frequency to application server 340 via communications network 330. User 380-1 traverses beyond geo-fence area 350 and into geo-fence area 351. The time log of user 380-1 exceeds a preconfigured fifth threshold value: an alarm operation pertaining to home environment 308 is activated by application server 340. Wherein, said time log encompasses several factors, comprising: (1) the distance between monitored home environment 308 and the geo-location of tracked mobile device 366-1; (2) the geo-fence area wherein tracked mobile device 366-1 carried by user 380-1 as inhabitant is located, versus geo-fence area 350, wherein the radius corresponds to home environment 308 as center-of-mass; (3) the difference between clock time and the projected arrival time $t_a$ at home environment 308 pertaining to geo-location tracked mobile device 366-1 carried by user 380-1 as inhabitant. In the event of occupancy sensor 361 located within monitored home environment 308 detecting occupancy during said alarm operation, application server 340 will trigger an alert through sending at least one message comprising pertinent information to mobile device 366-1.

In embodiment ten, user 380-1 as inhabitant of home environment 308 establishes a temporary authorization, comprising: a starting date and a span of days with a specific time period of stay on each of those days in accordance with the clock time ("authorized visit time"); user 380-2 as visitor ("authorized visitor") carrying mobile device 366-2, and user 380-3 as authorized visitor carrying Identification means 365, is authorized to visit home environment 308 during said authorized visit time. An alarm operation pertaining to home environment 308 is otherwise normally activated by application server 340 during said days. In the event of occupancy sensor 361 located within monitored home environment 308 detecting occupancy during said alarm operation, application server 340 prompts a message requesting for a response message to said tracked mobile device 366-1 carried by user 380-1, as well as, mobile device 366-2 carried by user 380-2 as authorized visitor; wherein, the time log pertaining to tracked mobile device 366-1 carried by user 380-1 as inhabitant is below the preconfigured fifth threshold value.

Application server 340 will not trigger an alert, providing home environment 308 located access gateway 368 receives and transports to application server 340 preferred information, comprising: (1) short-range wireless response message sent by tracked mobile device 366-1 carried by user 380-1 as inhabitant; or, (2) short-range wireless response message sent by mobile device 366-2 carried by user 380-2 as authorized visitor, wherein the clock time is within the authorized visit time; or, (3) wireless signals transmitted by identification means 365 carried by user 380-3 as authorized visitor, wherein the clock time is within the authorized visit time.

Those skilled in the art will appreciate that the exemplary methods disclosed herein may be applied to any geo-fenced area represented by any number of shapes and sizes. There are a number of methods for constructing these geo-fences which will be apparent to one skilled in the art. A geo-fence around a center of mass including a building or independent house may range in complexity from a line to a highly irregular shape which more accurately follows the landscape of home environment 308 premises and neighborhood. Application server 340 can alter the shape of geo-fence area in shape and number of plurality, in accordance with preconditioning factors pertinent to traffic conditions, time of the day, the unique identifier of mobile device 366, as well as, characteristics of the user or the related home environment 308 and building environment 303, etc.

Figure 4:
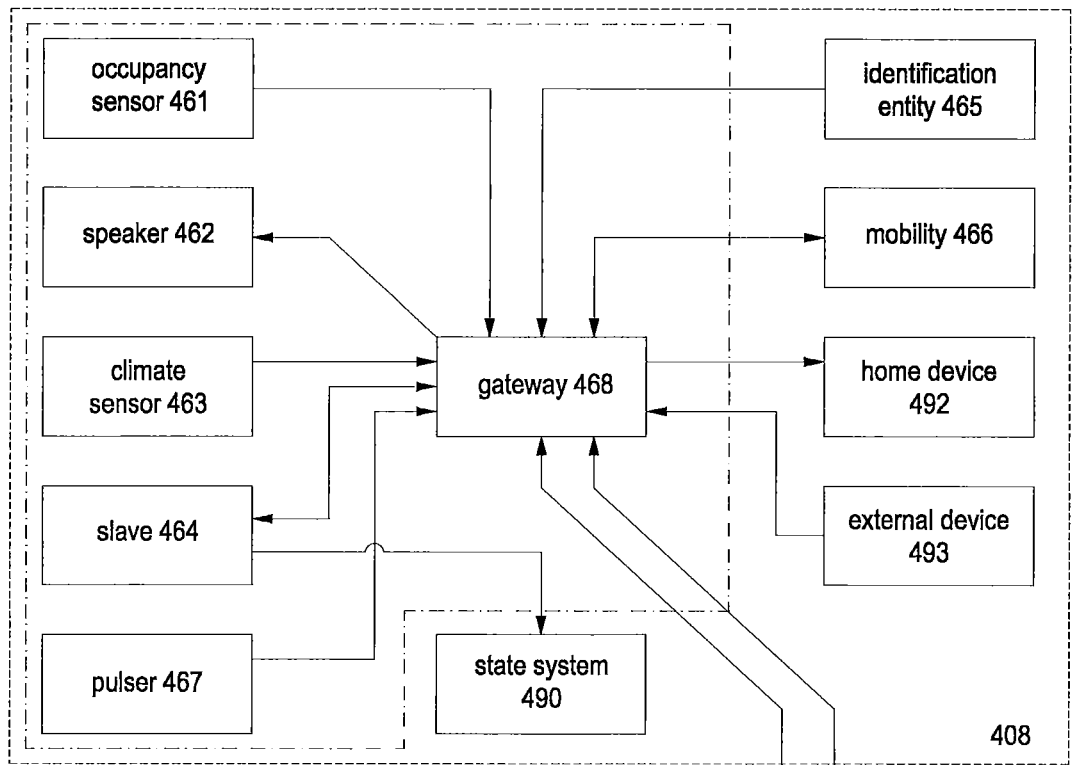
FIG. 4 illustrates the block diagram representing the Infrastructure of a cloud node centric alarm control system, wherein user locations and information are employed for cloud node driven arming and disarming alarm operation, as well as, alert triggering.
Figure 4:
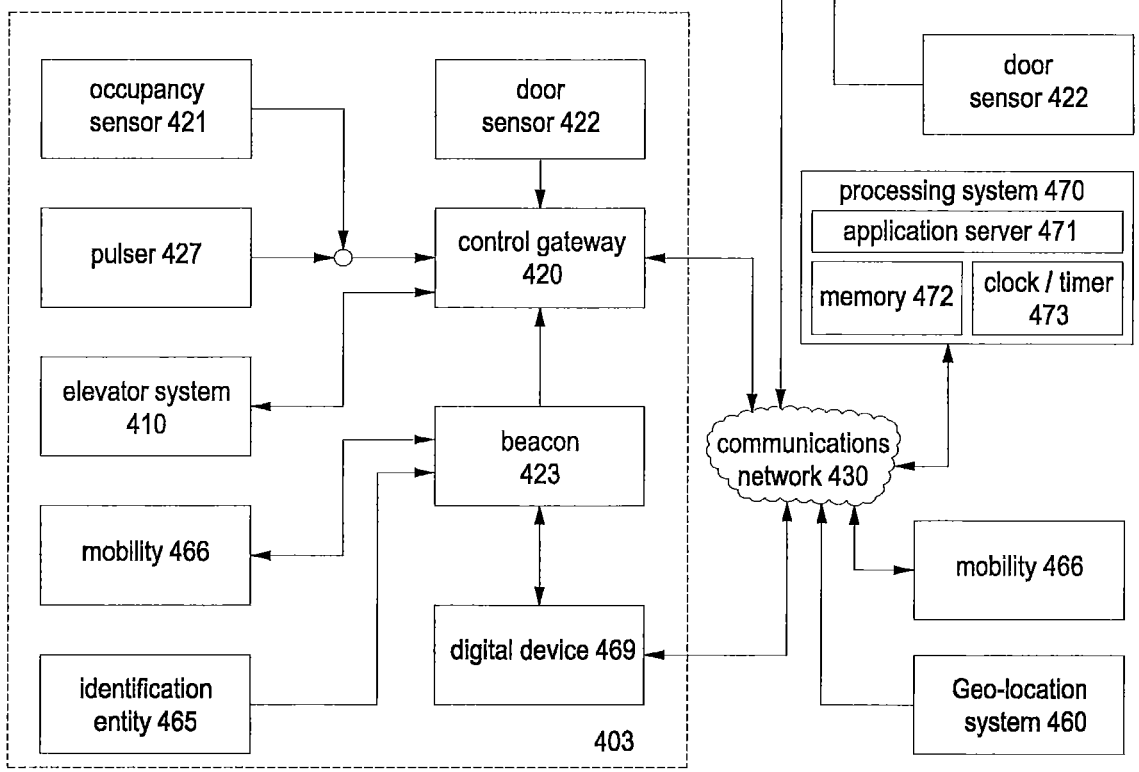

FIG. 4 illustrates a networking schematic diagram of a preferred embodiment of the present invention alarm system 400.

Application server 440 may be an internet accessible cloud service node located, user-configurable routing device mounted with at least one digital processor-monitoring at least one building environment 403 and at least one home environment 408 through receiving and rerouting preferred information via communications network 430 between other devices, comprising: at least one database 441, control gateway 420, access gateway 468, mobile device 466, and digital device 469. Once application server 440 receives said devices sent preferred Information, processes and transmits the encompassed data in accordance with its programming. In one embodiment, a wide variety of commercially available computer servers can be used in conjunction with appropriate software to function as application server 440. Those of ordinary skill in the art of computer programming can readily design such software if a suitable alternative is not found to be commercially available. LINUX and e++, for example, are able to be so adapted to affect desired receipt and rerouting of information received from access gateway 468 and control gateway 420. In one example, the wireless digital alarm data may be processed into alert information for dispersal to further receiving parties as discussed herein. An emergency entity, such as police, fire department, and/or rescue squads, may also receive alert Information.

Database 441 can be any device, including magnetic, optical or solid-state memory for storing preferred Information relevant to a user or administrator of alarm system 400. Exemplary database information may include personal data of the user, alert archives, reports, sensor and system event sequences, and/or other Information that may be retrieved for use thereafter. A library of predefined geo-fence boundaries, the polling interval at constant or variable frequency directing data-logging between application server 440 and mobile device 466, application server 440 and digital device 469, and quantitative calculations performed by application server 440, is also stored in database 441 and retrieved by application server 440 via communications network 430. Wherein database 441 can be located at a cloud service node working with or within application server 440, or other service nodes: such as a node of monitored home environment 408 or building environment 403; a node comprising mobile device 466 carried by a user, or digital device 469 used by management security staff.

Geo-location system 460 is a terrestrial or satellite based positioning system; some of which include but not limited to the Beidou Navigation System, Differential GPS ("DGPS"), Eurofix DGPS, Global Positioning System ("GPS"), pertaining to the Global Navigation Satellite System ("GNSS"). In other types of positioning systems, geo-location system 460 comprising cellular communication towers, or other systems providing reference points, transmit wireless radio frequency ("RF") signals that are received by mobile device mobile device 466 and digital device 469. Application server 440 can alter the shape of geo-fence boundary comprising geo-fence area, in accordance with preconditioning factors pertinent to traffic conditions, time of the day, the unique identifier of mobile device 466, characteristics of the user or home environment 408, etc.

Identification means 465 is typically an IC (integrated circuit) card comprising a battery, storage means for storing identification information, and a transmitter for transmitting wireless signals comprising the identification information to control gateway 420 and access gateway 468 via a short-range wireless communication link. Several short-range communication protocols could be used, for example, Bluetooth, WiFi (IEEE 802.11b) or ZigBee (IEEE 802.15.4).

In building environment 403, control gateway 420 contains a network port for communicating with several networks, comprising: wired and wireless local area network ("LAN"), Ethernet LAN; an existing public switched telephone network ("PSTN") and an Internet Protocol ("IP") network. Control gateway 420 encompasses communicating means for communicating with the plurality of sensors and devices, and storage means storing the corresponding unique identifiers, comprising: occupancy sensor 421, door sensor 422 pertinent to the entry doorway of home environment 408, surveillance sensor 423, pulser 427, and elevator system 410.

In home environment 408, access gateway 468 contains a network port for communicating with several networks, comprising: wired and wireless LAN, Ethernet LAN; an existing PSTN and an IP network. Access gateway 468 encompasses communicating means, such as a wireless module, for communicating with the plurality of sensors and devices, storage means storing the corresponding unique identifiers, comprising: occupancy sensor 461, door sensor 422 pertinent to the entry doorway of home environment 408, pulser 467, and home device 463. Access gateway 468 also comprises a module for communicating through a short-range wireless communication link with identification means 465 and mobile device 466. Short-range communication protocols including Bluetooth or WiFi may be used.

Communications network 430 uses a combination of wireless and landline communication infrastructure such as a cellular telecommunication system and the Internet, including broadband, WiMax, fixed line POTS (plain old telephone service), cable modem, DSL (digital subscriber links), wireless via a cellular telephone network such as the standard GSM, two-way pager, packet switched or next generation services such as UMTS, etc. Communication may be established through various mediums, such as an exemplary modem, which may transmit TCP/IP communication channel to application server 440. Control gateway 420 and access gateway 468 may communicate with application server 440 via various modes of communications network 430.

Communications network 430 provides two-way datalogging between application server 440 and telematics devices, including but not limited to mobile device 466 and digital device 469. Wherein, application server 440 transmits the wireless digital alarm data in a formatted text message to a plurality of mobile devices 466, and digital devices 469, which may send an acknowledgement of receipt of the data back to application server 440. As used herein, mobile device 466 and digital device 469 may be any device capable of receiving SMS type data, or any wireless digital data, comprising digital cellular telephone, pager, personal communications systems ("PCS"), enhanced specialized mobile radios ("ESMRs"), wireless electronic mail receivers (e.g., the Blackberry® and Treo® devices), multimedia Internet enabled cellular telephones (e.g., the iPhone®), GPS receivers and similar personal electronic devices which Include a programmable processor and memory, and communication transceiver capable of connecting to a wired or wireless network. In furtherance, digital device 469 also comprises a network linked electronic device with computing capacity such as a microcomputer, an Internet server, a portable client device of PSTN, or a static device operative of e-mail account of the premise's owner or agent. In this manner, the alarm user may receive a notification of the alert on mobile device 466 and digital device 469. In another embodiment, mobile device 466 and digital device 469 are also configured for communicating with control gateway 420 and access gateway 468 using a short-range wireless communication protocol, including but not limited to Bluetooth, WiFi, WiMax, and other wireless data network communication technologies.

Door sensor 422, comprising an apparatus with dual metal plate as sensing means, or an electronic door lock, typically mounted in the doorway for entry into home environment 408, transmits a wired or wireless signal to access gateway 468 and/or control gateway 420 when change between the closed state and open state. A short-range wireless communication protocol, including but not limited to Bluetooth, WiFi, WiMax, etc.

Surveillance device 423 includes a short-range wireless transceiver, or an access point with wired and wireless network connectivity, comprising: a storage means storing a unique identifier identifiable by application server 440; a wireless module for short-range wireless communication with the plurality of Identification means 465, mobile devices 466, and digital devices 469; network port for connectivity with control gateway 420 via LAN; network port for connection to an Internet connected router. Application server 440 uses the recorded location information pertaining to the unique identifier of surveillance device 423 for use in conjunction with predefined rules to determine the location, comprising: the geographical position of building environment 403, or the distance between the location of surveillance device 423 in building environment 403 and at least one monitored home environment 408. Several short-range communication protocols could be used, for example, Bluetooth or WiFi.

Occupancy sensor 461 detects occupancy within home environment 408 and transmits wired or wireless signals comprising a unique identifier that are sent to access gateway 468 for transport to application server 440. Occupancy sensor 421 detects occupancy within building environment 403 and transmits wired or wireless signals comprising a unique identifier that are sent to control gateway 420 for transport to application server 440. In an exemplary embodiment, occupancy sensors 421 and 461 comprise a communicating means for communicating with the corresponding control gateway 420 and access gateway 468, a storage means storing a unique Identifier, a passive Infrared ("PIR") receiver, an ultrasonic transducer, or an image capturing device for capturing images and transmitting captured images to access gateway 468—wherein application server 440 detects occupancy using at least one image processing method by processing said captured images received from access gateway 468. wherein application server 440 processes said captured images received from access gateway 468 using at least one image processing method for occupancy detection The monitored occupancy within home environment 408 and building environment 403 is determined collectively from the three sensor technologies according to individual settings of each sensor technology as well as combinational logic.

Home device 463 is a normally closed compartment, comprising: a storage means storing a unique identifier, and a communicating means for communicative connectivity with access gateway 468. Home device 463 includes but is not limited to a depository, a repository, and a safe; wherein, it is configured to transmit a wired or wireless signal to access gateway 468 upon a change from the closed state to the open state, as well from the open state to the closed state.

Pulser 427 is a generator of synchronization pulses intended for at least two registers, including a first input intended to receive an application server 440 sent clock signal, and at least one output to deliver the pulses on the clock input of said registers. Pulser 427 transmits said pulses through a communicating means as wired and/or wireless signals at an oscillated frequency for receiving by control gateway 420 within building environment 403; likewise, pulser 467 transmits said pulses through a communicating means as wired and/or wireless signals at an oscillated frequency for receiving by access gateway 468 within home environment 408. In an exemplary embodiment, pulser 467 is a wireless RF transmitter working within occupancy sensor 461, transmitting wireless signals comprising unique Identifier information of occupancy sensor 461. In another embodiment, pulser 427 is an independent component transmitting wired signals to control gateway 420, comprising the corresponding identifier Information related to territorial location within building environment 403.

Elevator system 410 is adapted to provide elevator service in building environment 403, and operated by at least one control unit (not shown)—a computer mounted with at least one processor, memory means, the required Interfaces and software. Said at least one control unit schedules the serving elevators for stopping at the landing floors in accordance with preferred information received from a variety of devices, including but not limited to control gateway 420, as well as, at least one call unit 116 (as shown in FIG. 1) for passenger entry, mobile device 466, and digital device 469.

Home Environment Alarm Operation

Figure 5:
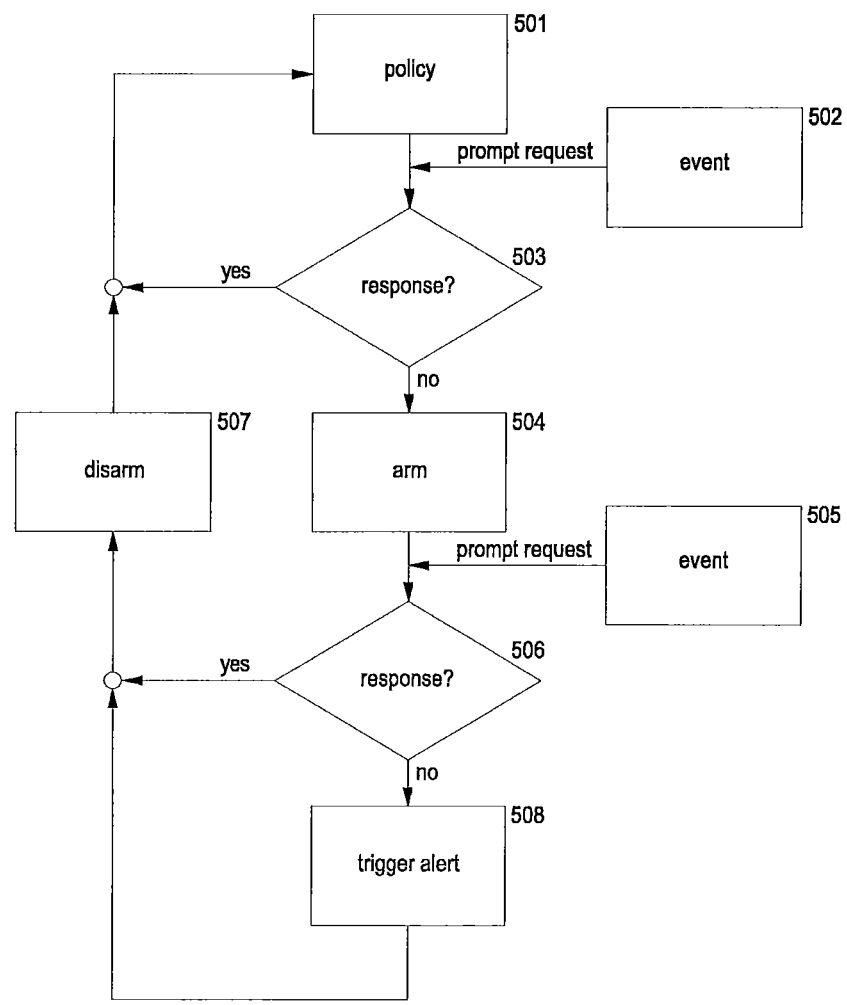
FIG. 5 is a flow chart demonstrating a method for cloud node driven arming and disarming alarm operation in a monitored living space, and alert triggering upon detected Intrusion.

In one aspect of the present invention, application server 440 at a cloud service node receives and processes preferred information sent by a plurality of devices in compliance with an established alarm policy based on a set of criteria to determine activation and deactivation of an alarm operation, as well as, to determine to indicate that an alert trigger condition is fulfilled in monitored home environment 408, and to send the pertinent information to receiving nodes in accordance with the alert trigger process. FIG. 5 shows a flowchart of method 500 for monitoring home environment 408 with an alarm operation in the present invention, comprising the steps as follows.

Establishment of an Alarm Policy:

Step 501: an alarm operation policy, an alarm operation activation and deactivation policy, an alert trigger policy are established by the administrator of the alarm system through a cloud service node—typically comprising application server 440—as alarm policy. Data-logging is established for interchange of preferred information transmitted and received between application server 440 and another system or device, comprising: (1) mobile device 466 carried by user as inhabitant, or user as authorized visitor pertinent to home environment 408; (2) digital device 469 used by management security staff; (3) access gateway 468 in at least one home environment 408.

A. Establishment of an Alarm Operation Policy:

The administrator establishes an alarm operation policy, comprising creation of criteria, information processing procedure and priority, modification, deletion and the like, on policy pertaining to each individual monitored home environment 408. The administrator is responsible for allocating and setting authorities for the user as inhabitant of monitored home environment 408 ("Inhabitant"), wherein the account number allocated to said user has an authority limit. The user as inhabitant is authorized to set the alarm policy of the pertinent home environment 408; a user as authorized visitor or management security staff are deprived of such authority. In the process of an activated alarm operation of an established alarm policy, the user as inhabitant is authorized for entry and stay at monitored home environment 408 without constraints in time or time duration; whereas, the user as authorized visitor is permitted for entry and stay at monitored home environment 408 with preconfigured constraints in time and time duration pertaining to date and time span in each stay in accordance with a temporary authorization of visit.

B. Establishment of an Alarm Operation Activation and Deactivation Policy.

The user as inhabitant may establish conditions of the policy. When preferred information sent by access gateway 468 to application server 440 satisfies one or more of the following conditions, application server 440 activates the alarm operation.

Given a temporary authorization of visit is not established by any user as inhabitant, the conditions for activation of an alarm operation comprise: (1) the time logs of tracked user carried mobile devices 466 carried by all pertinent users as inhabitants exceed the fifth preconfigured threshold value; or (2) after door sensor 422 located at the entrance of monitored home environment 408 changes from a closed state to an open state, the wireless signals—pertaining to at least one mobile device 466 or identification means 465 carried by user as inhabitant—are not received, within a time span greater than the preconfigured first threshold value, by access gateway 468 for transport to application server 440.

Given a temporary authorization of visit has been established by a user as inhabitant; wherein, the clock time is within a time span corresponding with the temporary authorization of visit, the condition for activation of an alarm operation comprises: (1) the time logs of tracked user carried mobile devices 466 carried by all pertinent users as inhabitants exceed the fifth preconfigured threshold value; or (2) after door sensor 422 located at the entrance of monitored home environment 408 changes from a closed state to an open state, the wireless signals—pertaining to at least one mobile device 466 or identification means 465 carried by user as inhabitant or authorized visitor—are not received, within a time span greater than the preconfigured first threshold value, by access gateway 488 for transport to application server 440.

On the other hand, upon occupancy sensor 461 detecting occupancy within monitored home environment 408 or door sensor 422 changing from a closed state to an open state, deactivation of an alarm operation is performed by application server 440 in accordance with satisfaction of one or more of the following conditions, comprising: (1) preferred information sent by at least one mobile device 466 or identification means 465 carried by user as inhabitant is received within a time span less than the preconfigured first threshold value by access gateway 468 for transport to application server 440 through communications network 430; or, (2) preferred information sent by at least one mobile device 466 or identification means 465 carried by user as authorized visitor is received by access gateway 468 for transport to application server 440 through communications network 430, wherein the clock time is within a time span corresponding with a temporary authorization of visit established by user as inhabitant, or the administrator.

C. Establishment of an Alert Trigger Policy:

In one embodiment of an activated alarm operation, a temporary authorization of visit is not established by any user as inhabitant, or, the clock time is outside a time span corresponding with a temporary authorization of visit; occupancy sensor 461 located within monitored home environment 408 detects occupancy. Wherein, the time logs of tracked user carried mobile devices 466 carried by all pertinent users as inhabitants of monitored home environment 408 exceed the fifth preconfigured threshold value. Application server 440 prompts a message requesting for a response message to at least one tracked mobile device 466 carried by user as Inhabitant. A short-range wireless response message will be sent by said at least one tracked mobile device 466 and received by access gateway 468 for transport to said application server 440—failure in compliance with the condition will result in satisfaction of set alert trigger conditions.

In an alternative embodiment of an activated alarm operation, a temporary authorization of visit has been established by a user as inhabitant, and, wherein the clock time is within a time span in accordance with a temporary authorization of visit; occupancy sensor 461 located within monitored home environment 408 detects occupancy. Wherein, the clock time has not surpassed the projected arrival time $t_a$ at home environment 408 pertaining to geo-location tracked mobile device 466 carried by a user as inhabitant Application server 440 prompts a message requesting for a response message to at least one mobile device 466 carried by user as authorized visitor. A short-range wireless response message will be sent by said mobile device 466, and received by access gateway 468 for transport to said application server 440—failure in compliance with the condition will result in satisfaction of set alert trigger conditions.

In one embodiment in which an alarm operation is not activated comprising: at least one home device 463 communicatively connected with access gateway 468 in said monitored home environment 408, which transmitting a signal pertaining to a change in state, comprising change from the closed state to open state within a time span smaller than a preconfigured sixth threshold value.

The alert trigger process comprises: (1) application server 440 notifies to a user carried mobile device 466 or management security staff used digital device 469 via a short message, and determines whether to proceed or to deactivate an alert trigger in accordance with the response message; (2) notification via an instant communication message; (3) notification via an Email; (4) notification via an automatic telephone voice; (5) notification via a multimedia message; (6) activation of a siren; (7) cancellation of an alert trigger in accordance with a received response message sent by the administrator, user as inhabitant, or, user as authorized visitor within a time span corresponding with the temporary authorization of visit established by user as inhabitant; (8) recording a processed alert trigger to database 441.

Step 502: application server 440 performs the monitoring operation by receiving preferred Information sent by access gateway 468, pertaining to a plurality of devices, including: door sensor 422, occupancy sensor 461, home device 463, identification means 465, geo-location tracked mobile device 466 and pulser 467. After application server 440 receives the Information, application server 440 performs verification of concurrent or last received geo-location of tracked mobile device 466 of at least one user of Inhabitant, and calculates the corresponding time log-encompassing the projected arrival time $t_a$ at home environment 408. Application server 440 matches on the Information in accordance with the alarm operation activation conditions of the alarm operation policy, and determines whether to activate an alarm operation in accordance with the established alarm operation policy. If so, go to step 504; otherwise, go to step 503, wherein the monitoring process is performed in accordance with the original flow.

Step 503: application server 440 performs the monitoring operation by receiving preferred information sent by said plurality of devices pertaining to monitored home environment 408 as aforementioned at Step 502. If any condition pertaining to activation of the alarm operation policy is fulfilled, go to step 504: application server 440 activates the alarm operation. If any condition pertaining to the alert trigger policy is fulfilled, go to step 506: application server 440 performs the alert trigger process.

Step 504: application server 440 activates the alarm operation, and receives preferred information sent by said plurality of devices pertaining to monitored home environment 408 as aforementioned at Step 502. After application server 440 receives said preferred information, application server 440 performs verification of concurrent or last received geo-location of tracked mobile device 466 of at least one user of inhabitant, and calculates the corresponding time log—encompassing the projected arrival time $t_a$ at home environment 408. Application server 440 matches on the information in accordance with the set alert trigger conditions of the alert trigger policy, and judges whether the Information satisfies the set alert trigger conditions. If so, go to step 506; otherwise, go to step 505, wherein the process of alarm operation is performed in accordance with the original flow.

Step 506: application server 440 checks the response of selected users upon fulfillment of alert trigger conditions, and determines to perform the set alert trigger process. After triggering an alert, application server 440 performs the alert trigger process and sends the information to a receiving node; including but not limited to at least one mobile device 466 pertaining to a user as Inhabitant, and a management security staff used digital device 469.

Step 507: application server 440 performs the alarm operation mandate for monitored home environment 408, at which the alarm operation is activated in accordance with established alarm operation policies.

The alert trigger process policy corresponds to recordation of a processed alert trigger in database 441. Application server 440 stores the pertinent information in database 441 in accordance with the alert trigger process, wherein database 441 can be located at the cloud service node or other service nodes. The alarm information may be retrieved for use thereafter.

Building Environment Alarm Operation

According to another aspect of the present invention, a method for monitoring building environment 403 encompassing at least one home environment 408 is provided, comprising: at least one application server 440 at a cloud service node receives and processes preferred information sent by at least one control gateway 420, as well as, preferred information sent by one or more mobile devices 466 and/or digital devices 469 used by a plurality of users pertaining to monitored building environment 403. Application server 440 uses the processed information, in accordance with an established alarm policy based on a set of criteria, to determine to indicate that an alert trigger condition is fulfilled in monitored building environment 403, and to send the pertinent information to receiving nodes in accordance with the alert trigger process.

Figure 6:
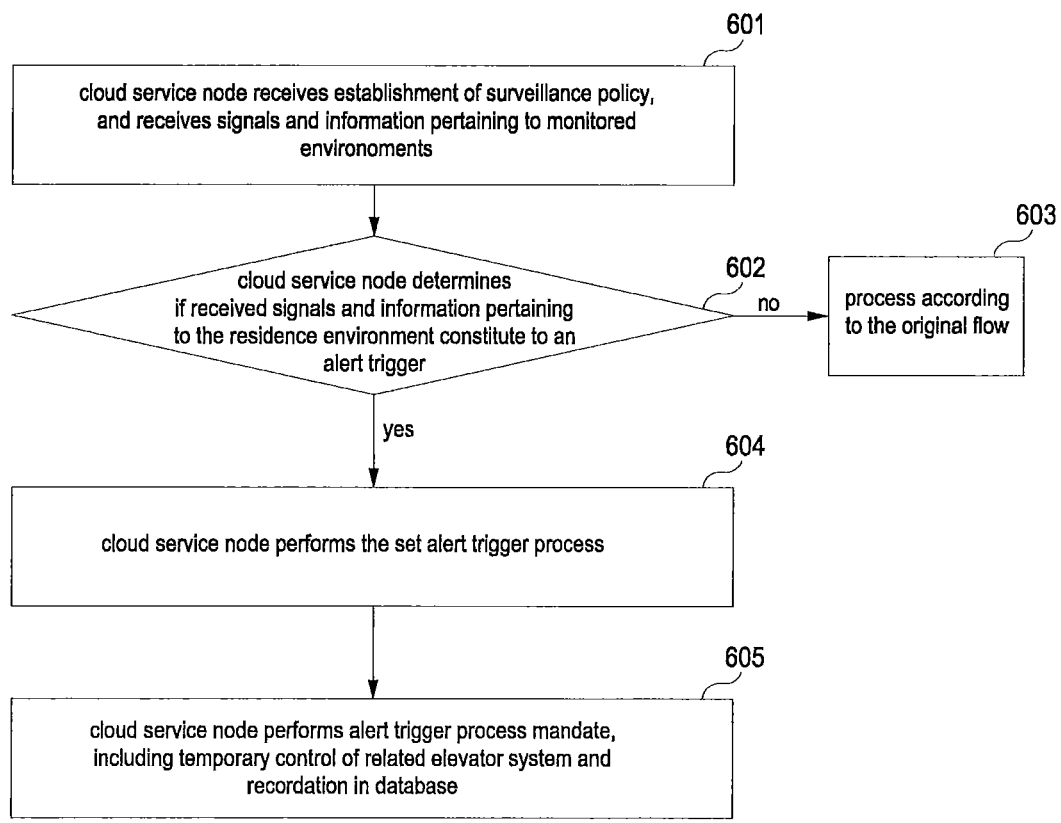
FIG. 6 is a flow chart demonstrating a method for cloud node driven alert triggering in an alarm operation in a residential building environment on basis of time based path tracking.

FIG. 6 shows a flowchart of method 600 for monitoring building environment 403 with an alarm operation in the present invention, comprising the steps as follows.

Establishment of an Alarm Policy:

Step 601: an alarm operation policy, and an alert trigger policy are established by the administrator of the alarm system through a cloud service node—typically comprising application server 440—as alarm policy. Data-logging is established for interchange of preferred information transmitted and received between application server 440 and another system or device, comprising: (1) mobile device 466 carried by user as inhabitant of home environment 408; (2) mobile device 466 carried by user as authorized visitor pertinent to building environment 403; (3) digital device 469 used by management security staff; (4) at least one control gateway 420 in building environment 403; (5) at least one elevator system 410 installed and operative in building environment 403.

A. Establishment of an Alarm Operation Policy:

The administrator establishes an alarm operation policy, comprising creation of criteria, information processing procedure and priority, modification, deletion and the like, on policy pertaining to monitored building environment 403. The administrator is responsible for allocating and setting authorities for the user as management security staff, wherein the account number allocated to said user has an authority limit. The user as management security staff is authorized to set the alarm policy of the pertinent building environment 403. In the process of alarm operation, the traversal paths pertaining to all users must comply with preconfigured constraints in time and/or time duration in accordance with an established alarm policy.

B. Establishment of an Alert Trigger Policy:

The alert trigger conditions pertaining to monitored building environment 403 during an alarm operation, comprising: (1) duration of detected occupancy at any particular location within monitored building environment 403 exceeding the preconfigured second threshold value; (2) total time period pertaining to at least one tracked user traversal path within monitored building environment 403 exceeding the preconfigured third threshold value; (3) door sensor 422 pertaining to a particular home environment 408 within monitored building environment 403 not triggered to send a signal pertaining to change of state, including from closed state to open state, within a time period pertaining to the preconfigured forth threshold value; (4) merger of two tracked user traversal paths pertaining to entry into a monitored home environment 408 located within a monitored building environment 403.

The alert trigger process comprises: (1) application server 440 notifies to a user carried mobile device 466 or management security staff used digital device 469 with a short message; (2) notification via an instant communication message; (3) notification via an Email; (4) notification via an automatic telephone voice; (5) notification via a multimedia message; (6) activation of a siren; (7) cancellation of an alert trigger in accordance with a received response message sent by the administrator, or, user as management security staff; (8) recording a processed alert trigger to database 441.

Activation and deactivation of an alarm operation pertaining to monitored building environment 403 may be performed by application server 440 in accordance with administrator authorization.

Step 602: application server 440 receives preferred information sent by a plurality of system and devices pertaining to monitored building environment 403, comprising: elevator system 410, control gateway 420, occupancy sensor 421, door sensor 422, surveillance device 423, pulser 427, mobile device 466 carried by user as Inhabitant, mobile device 466 carried by user as authorized visitor pertaining to a particular home environment 408 within monitored building environment 403, management security staff used digital device 469.

Given a temporary authorization of visit has been established by a user as management security staff, application server 440 tracks the traversal path of said user as visitor by processing signals sent from a plurality of occupancy sensors 421 and door sensors 422, mobile device 466 or electronic readable means 465 carried by said visitor, as well as, preferred information received from at least one elevator system 410. Destination of said traversal path must comply with at least one home environment 408; wherein, door sensor 422 pertaining to said at least one home environment 408 must be triggered to send a signal pertaining to change of state, including from closed state to open state, within a time period pertaining to the preconfigured forth threshold value. Failure in compliance with the condition will result in satisfaction of set alert trigger conditions.

In the event that duration of detected occupancy at a particular location within monitored building environment 403 exceeds the preconfigured second threshold value; or, the total time period pertaining to at least one tracked user traversal path within monitored building environment 403 exceeds the preconfigured third threshold value, application server 440 prompts a message requesting for a response message to at least one management security staff used digital device 469 via surveillance device 423 or telecommunications network 430. A short-range wireless response message will be sent by said at least one management security staff used digital device 469 and received by application server 440 via at least one surveillance device 423—failure in compliance with the condition will result in satisfaction of set alert trigger conditions.

Application server 440 can select alert trigger conditions in accordance with priority of the alert trigger condition policy. After application server 440 receives the preferred information, application server 440 judges whether said preferred information satisfies the set alert trigger conditions; if so, go to step 604; otherwise, go to step 603, wherein the process of alarm operation is performed in accordance with the original flow.

Step 604: application server 440 performs the set alert trigger process. After triggering an alert, application server 440 performs the alert trigger process and sends the Information to a receiving node, including but not limited to at least one management security staff used digital device 469, and mobile device 466 pertaining to a user as inhabitant of a particular home environment 408.

Step 605: application server 440 performs the alarm operation mandate for monitored building environment 403 at which the alarm operation Is activated in accordance with established alarm operation policies.

The alert trigger process policy corresponds to recordation of a processed alert trigger in database 441. Application server 440 stores the pertinent information in database 441 in accordance with the alert trigger process, wherein database 441 can be located at the cloud service node or other service nodes. The alarm information may be retrieved for use thereafter.

What is claimed is:

1. A method of monitoring a space, comprising: monitoring in a disarmed mode having ascertained one or more mobile devices are located within a distance threshold; monitoring in an armed mode having ascertained one or more mobile devices are located beyond a distance threshold; or monitoring in an armed mode following a lapse of a predetermined visit time period.

2. The method of claim 1, comprising triggering at least one alert upon detected occupancy while operating in the armed mode.

3. The method of claim 1, wherein one or more mobile devices are located within a distance threshold attributing to short-range wireless pairing communicative linkages with the one or more mobile devices.

4. The method of claim 1, wherein one or more mobile devices are located beyond a distance threshold attributing to dislodged short-range wireless pairing communicative linkages with the one or more mobile devices.

5. The method of claim 1, comprising a communicatively linked temperature control device controlling the monitored space indoor temperature at a setpoint temperature setting in the disarmed mode; or a communicatively linked temperature control device controlling the monitored space indoor temperature at a setback temperature setting in with the armed mode.

6. The method of claim 1, comprising one or more communicatively linked devices operating at operative settings corresponding with the disarmed mode; or one or more communicatively linked devices operating at operative settings corresponding with the armed mode.

7. The method of claim 2, wherein triggering an alert comprises activating a siren.

8. The method of claim 7, wherein triggering an alert further comprises sending a message via a network to at least one mobile device, wherein the message comprises any one of a signal, an instant communicative message, an email, an automatic telephone voice, a multimedia message, and a combination thereof.

9. The method of claim 2, wherein triggering an alert comprises recording the alert in a communicatively linked memory.

10. The method of claim 2, wherein detecting occupancy comprises operating any one or a combination of a passive infrared sensor, an image capturing sensor thereof.

11. A method comprising: monitoring a space when receiving via a network information pertaining to the locations of one or more mobile devices; operating in a mode in accordance with the locations of the one or more mobile devices being beyond a distance threshold from the unoccupied space, including controlling, as in operating and non-operating, a temperature control device for maintaining the indoor temperature of the unoccupied space at a setback temperature settings; storing in a memory setback and set point temperature settings.

12. An apparatus for monitoring a space, the apparatus comprising: communicative linkage with at least one memory coupled application server through a network; communicative linkages with one or more devices pertinent to monitoring the space; monitoring in accordance with a disarmed mode pertaining to ascertainment of one or more mobile devices being located within a distance threshold, or, short-range wireless pairing communicative linkages with the one or more mobile devices; monitoring in accordance with an armed mode pertaining to ascertainment of one or more mobile devices being located beyond a distance threshold, or, dislodged short-range wireless pairing communicative linkages with the one or more mobile devices; or monitoring in accordance with an armed mode at the lapse of a predetermined visit time period.

13. The apparatus of claim 12, wherein the one or more devices comprise a temperature control device controlling the indoor temperature of the monitored space at a setpoint temperature setting while operating in accordance with the disarmed mode, or, controlling the indoor temperature of the monitored space at setback temperature settings while operating in accordance with the armed mode; or one or more communicatively linked devices operating at operative settings in accordance with the disarmed mode, wherein the operative settings including but not limited to operating in the power on mode, or power off mode; or one or more communicatively linked devices operating at operative settings in accordance with the armed mode, wherein the operative settings including but not limited to operating in the power off mode, or power off mode.

14. The apparatus of claim 12, wherein the one or more devices further comprises a temperature sensor; one or more light fixtures; or a door lock.

15. The method of claim 6, wherein the operative settings comprises operating in the power on mode, non-operating in the power off mode.

* * * * *